Patented May 22, 1951

2,554,273

UNITED STATES PATENT OFFICE 2,554,273

PRODUCING HYDROCARBON RESINS FOR COATING COMPOSITIONS

Ober C. Slotterbeck, Rahway, and David W. Young, Roselle, N. J., assignors to Standard Oil Development Company, a corporation of Delaware No Drawing. Application December 11, 1945, Serial No. 634,405

2 Claims. (Cl. 260—23.7)

This invention relates to low temperature interpolymers of a diolefin with an isoolefin; relates particularly to solutions of diolefin-isoolefin copolymers in drying oils; and relates especially to methods for making drying oil solutions of polymers having a high polymer content and a sufficiently low viscosity to be pumped; and to the resulting product.

It has been found possible to produce very valuable compositions of an isoolefin and a diolefin containing a relatively high proportion of the diolefin by copolymerizing a mixture of the isoolefin and diolefin at temperatures ranging from about +20° F. down to about —40° F. by the application to the cold olefinic mixture of a dissolved Friedel-Crafts catalyst to yield a material which is readily soluble in linseed oil in relatively high proportion to yield an extremely valuable varnish, paint or enamel composition. It is found however that good quality of varnish, especially after dissolving the copolymer in linseed oil and before cooking, requires that the solution consist of at least 15 gallon length (15 gallons of drying oil per 100 pounds of resin), since this proportion cooks to a very superior varnish. It is however found that the copolymer resin, as previously produced, when dissolved in linseed oil in this proportion, yields a material which is too thick and viscous to be pumped. Pumping can be accomplished in the average paint plant only with a material which has a viscosity below "Gardner Z6" (149 poises).

It is now found that if a polymer is prepared having a somewhat lower reactivity, by reducing the amount of diolefin in the copolymerizate mixture to a value near to 50% by weight (within the range between 45% and 55% by weight), the portions of 55% to 45% being the isoolefin, and this material is polymerized at a temperature below +10° F. to a yield not more than 89% of the olefinic material, a copolymer is obtained which, when dissolved to the extent of about 50% in linseed oil, yields a solution having a viscosity below the required Gardner Z-6, yet, at the same time, cooks readily in a short time to yield a very satisfactory varnish which can readily be cut back with appropriate solvents to yield a highly satisfactory varnish or enamel or paint base. It has been found that resins made with less than 45 to 55% butadiene in the active feed have a very long cook time in linseed oil. Therefore, these resins are not of great value in the varnish trade.

Thus the invention produces a solution of a copolymer of an isoolefin and a diolefin in linseed oil having a viscosity less than Gardner Z-6 which can be cooked in a relatively short time into a high-grade varnish or enamel or paint base, by the steps of mixing together a diolefin such as butadiene in the proportion of 45% to 55% with an isoolefin such as diisobutylene in the proportion of 55% to 45%, cooling the mixture to a temperature within the range between +10° F. and —15° F., polymerizing the mixture by the addition of a dissolved Friedel-Crafts catalyst in solution in a suitable solvent such as ethyl or methyl chloride; carrying the polymerization no further than about an 89% yield; thereafter dissolving the resulting polymer in linseed oil to about 50% weight concentration and cooking the oil at temperatures between 565° F. to 595° F. for a time interval within the range between 2 and 7 hours to yield the desired varnish, the solution of polymer in linseed oil having a viscosity low enough, before cooking, to permit the material being handled by pumps. After cooking the varnish pots are tilted to allow the resin-linseed oil cook to flow into solvent vats at such a rate that the solvent does not flash off. A pump is not used in this operation. Other objects and details of the invention will be apparent from the following description:

The copolymerizate of the material of the present invention is a mixture of a multi-olefin which is preferably butadiene, but may be any diolefin or multi-olefin having a carbon atom number per molecule within the range between 4 and 14. Such other substances as isoprene, dimethyl butadiene, piperylene, dimethallyl, myrcene, allocymene, and the like are particularly suitable. The second component of the copolymerizate mixture consists of an olefin of which the preferred form is the octene known as diisobutylene. However, other olefins having from 3 to about 15 carbon atoms per molecule are equally usable including such substances as propylene, normal- and iso-butylene, the various normal- and iso-pentenes, all of the hexenes, the heptenes, the octenes, and the like up to about 18 carbon atoms, both the normal and iso forms being equally usable. This mixture may be diluted with suitable amounts of low boiling inert diluents, preferably hydrocarbons, such as ethane, butane, propane, pentane, hexane, heptane, light naphtha and the like, or with the lower, halogen-substituted hydrocarbons such as propyl or butyl halides; or the olefinic mixture may be used without dilution.

The material is then cooled to a temperature below about +20° F., preferably within the range between +10° F. and −15° F., although temperatures as low as −40° F. are sometimes useful. The cooling may be obtained by the use of a refrigerating jacket upon the reactor, or by the addition of limited amounts of a low boiling, inert refrigerant such as propane or ethane, or, on occasion, butane. The amount of refrigerant is preferably restricted and the cooling is supplied by reflux return of a steady, small stream of cold refrigerant from a reflux condenser, cooled by such refrigerants as solid carbon dioxide or liquid ammonia or liquid ethane, or the like. By the use of a limited amount of refrigerant, a composite boiling point in the mixture is obtained which is readily adjusted, and is maintained by the stream of very cold reflux, the stream of cold reflux being automatically adjusted by the rate of evaporation of the refrigerant from the mixture to maintain the desired temperatures, and a decrease in the amount of refrigerant or the use of a higher boiling refrigerant results in a higher stable temperature.

The polymerization is then conducted by adding to the rapidly stirred mixture a dissolved Friedel-Crafts catalyst. The catalyst may be any of the Friedel-Crafts catalysts disclosed by N. O. Calloway in his article on "The Friedel-Crafts synthesis" printed in the issue of "Chemical Reviews" published for the American Chemical Society at Baltimore in 1935, in volume XVII, No. 3, the article beginning on page 327, the list being particularly well shown on page 375. The preferred catalyst substance is aluminum chloride, but other aluminum salts such as aluminum chlorobromide, or the double salt of aluminum chloride and aluminum alkoxide or boron trifluoride in solution in an inert diluent, or titanium tetrachloride, or the like may be used. For the solvent, the preferred solvents with aluminum chloride are ethyl or methyl chloride or carbon disulfide or ethylene dichloride or chloroform, or other alkyl groups having less than 5 carbon atoms per molecule and one or more halogen substituents, provided the freezing point of the solvent is not more than a limited number of degress above the polymerization temperature, preferably not more than 10° above the polymerization temperature. For the aluminum chlorobromide, the above mentioned solvents and also the lighter hydrocarbons are suitable catalyst solvents. With boron trifluoride, any of these solvents are satisfactory. Titanium tetrachloride being liquid, may be used without solvent, although it is preferably mixed with one or another of these same solvents.

The catalyst solution is preferably added to the cold polymerizate preferably in the form of a very fine jet under substantial pressure into the body of the vigorously stirred olefinic material. Alternatively, however, the catalyst solution may be added in the form of a fine spray onto the surface of the rapidly stirred olefinic material or by other means, as desired.

The polymerization proceeds at good speed, although it is not necessarily instantaneous, and the catalyst is preferably added over a period of a substantial number of minutes to several hours, depending upon the size of the batch, or other handling arrangements. The heat of reaction is removed by the refrigerant to the reflux condenser and there absorbed, with the return of the refrigerant in the form of a suitable stream of cold reflux.

According to the present invention, the temperature is preferably kept within the range between +10° F. and −15° F., the best temperature being about 0° F. to +5° F.

The polymerization is continued until from 60% to 89% of the olefinic material is polymerized, at which point the supply of catalyst is interrupted and the cold mixture discharged from the reactor into suitable finishing apparatus which may be a tank of warm naphtha or hot water or warm linseed oil, or the like. In warm naphtha, the polymer dissolves promptly and the refrigerant, catalyst solvents and unpolymerized olefinic materials are quickly volatilized, leaving the resinous polymer in solution in the light naphtha. The naphtha solution may be washed with water to remove the catalyst and the resin may then be separated in any convenient way such as by boiling out the naphtha or by precipitation of the resin by the addition of small amounts of an alcohol such as ethyl alcohol or

TABLE 1

*Evaluation of butadiene-dimer copolymer resin made at +10° F. to −15° F. by use of $ACl_3$-EtCl catalyst*

[50% butadiene-50% dimer (diisobutylene).]

| Resin No. | Gallon Length in Linseed Oil | Cooking Time, Hours | Final Cure[1] Point Sec. | Gardner Vis. on resin-linseed oil cook after cut back to 25% resin content by use of Varsol No. 1 | Gardner Color | Tack-Free Time, Hours | Shore Hardness (Baked) |
|---|---|---|---|---|---|---|---|
| 1 | 15 | 4½ | 40 | I | 11 | 4 | 23 |

| | Pencil Hardness (Baked) | Cold Water[2] Resistance (Baked) | Boiling Water Resistance[2] (Baked) | Grease Resistance (Baked) | Alkali[3] Resistance |
|---|---|---|---|---|---|
| 1 | 6 | 2 | 1 | 2 | Good |

[1] Determined on Thermo Electric Co. Heater at 200° C.
[2] Panels were immersed in cold water for 48 hours, and boiling water, for one hour. Water resistance was judged as follows:
Rating:                               Effect
1 ............................................................ Not visibly affected.
2 ............................................................ Whitening disappears within 20 minutes.
[3] Alkali resistance was judged by immersing an air dried film in 3% NaOH for 3½ hours. The removal of film, whitening and blistering were judged separately and rated numerically, 1 being excellent and 5 being very poor.

isopropyl alcohol, or the like. In warm water the polymer forms a slurry and all of the volatiles are boiled out, and in addition, a substantial portion of the catalyst is washed out. Similarly, in warm linseed oil the polymer dissolves quite completely with volatilization of all of the above-mentioned materials. In linseed oil, likewise the catalyst is readily removed by washing with warm water or a very mild alkali solution. (Care must be taken not to treat linseed oil with a strong alkali.)

In the event that the resin is recovered in naphtha or water, the naphtha or water is removed by heat.

The processed polymer is then dissolved in linseed oil in the proportion of about 40 to 60 parts by weight of polymer per 60 to 40 parts by weight of linseed oil and it is found that the resulting polymer solution has a sufficiently low viscosity to be handled by pumping.

It is further found that if the polymerization temperature goes above about +21° F., the resulting polymer is of such a character that when dissolved in 50% concentration in linseed oil, the solution is too viscous to be handled by pumps; likewise, if the amount of diolefin is above about 55%, the resulting copolymer, when in solution in linseed oil, also is too thick to be pumped; and, in addition, if the polymerization is carried to a yield higher than 89%, the 50% solution in linseed oil is too thick to be pumped.

Thus, the invention utilizes 3 critical factors, to-wit, a temperature between +10° F. and −15° F. for the polymerization, a multi-olefin ratio between 45 and 55%, and a yield less than 89%, to produce a polymer which, when dissolved in linseed oil in 15 gallon length (15 gallons of drying oil per 100 pounds of resin) or about 50% solution, has a viscosity sufficiently low to be pumped, yet can be cooked into a satisfactory varnish or paint base. A typical evaluation of this type of hydrocarbon resin is given in table form. See Table No. 1. The Gardner color is less than 12.

EXAMPLE 1

A series of polymerizations were conducted at varying temperatures between −15° F. and +21° F. Propane was used as a refluxing diluent. The polymerization being carried to per cent yields between 61 and 99. The softening points of the purified resins, the per cent gel (or naphtha insoluble matter) was determined, also the per cent ash, the per cent carbon and hydrogen, the carbon to hydrogen ratio, the iodine number, and the like were then determined, as shown in Table 2. It may be noted that the copolymerizate mixture contained 50% butadiene and 50% of the octene obtained by dimerizing isobutylene. The catalyst was aluminum chloride dissolved in ethyl chloride. Aluminum chloride (2% as $AlCl_3$) was used in each polymerization as calculated on active olefin feed. The concentration of $AlCl_3$ in the EtCl was 5% by weight.

TABLE 2

*Evaluation of butadiene-diisobutylene copolymer resin made under reflux—temperature of reaction being the sole variable*

[(50% butadiene-50% dimer or diisobutylene)-(2% $AlCl_3$ used).]

| Reaction Temp., °F. | Per Cent Yield | Soft. Pt., °C. (Ring and Ball) | Per Cent Gel (By Weight) | Per Cent Ash | Per Cent Fe | Per Cent C | Per Cent H | C/H Ratio | Iodine No. | Per Cent Cl | Visc. (Gardner) Cut Back Varnish | Color, Gardner | Cook Time, Hrs. at 292° C. | Cure Point of Varnish, 15 gal. Length | Gardner Vis. on 50% Resin Linseed Oil Sol. Before Cook |
|---|---|---|---|---|---|---|---|---|---|---|---|---|---|---|---|
| −15 | 61 | 65 | 2.26 | 0.09 | 0.0008 | 87.15 | 13.06 | 6.7 | 131.9 | 0.3 | C | 11 | 4.67 | Sec. 38 | Less than Z6. |
| −12 | 68 | 90 | 3.59 | 0.03 | 0.0014 | | | 6.8 | 143.3 | 0.06 | | 11 | 4.88 | | Do. |
| −5 | 76 | 88 | 1.02 | 0.23 | 0.0005 | | | 6.8 | 135.0 | 0.06 | D | 9 | 5.58 | 39 | Do. |
| 0 | 79 | 83 | 1.01 | 0.23 | 0.0002 | | | 6.8 | 132.3 | 0.12 | N | 11 | 4.83 | 39 | Do. |
| +7 | 80 | 90 | 0.79 | 0.21 | 0.0004 | 87.25 | 12.84 | 6.8 | 134.1 | 0.08 | K | 10 | 3.42 | 40 | Do. |
| +10 | 90 | Gelled | 8.88 | 0.44 | 0.0004 | | | (¹) | (¹) | 0.11 | | | | | Greater than Z6. |
| +21 | 92 | ...do... | 98.88 | 0.49 | 0.0006 | | | (¹) | (¹) | 0.12 | | | | | Do. |

¹ Not det.

Table No. 3 presents data on resins formulated from an active feed that had 60% butadiene and 40% diisobutylene. Propane was used as a refluxing diluent. It is to be noted that at this diene-diisobutylene ratio only low yields can be obtained and still have the required viscosity in oil. Such a ratio is not of value in the usual batch type procedure.

Thus, this series of runs shows critical nature of the polymerization temperature, the diolefin proportion, and the yield.

TABLE 3

*Evaluation of butadiene-diisobutylene copolymer resin made under reflux—temperature of reaction being the sole variable*

[(60% butadiene-40% diisobutylene)-(1.8% ($AlCl_3$) used).]

| Reaction Temp., °F. | Per Cent Yield | Soft. Pt. °C. (Ring and Ball) | Per Cent Gel | C/H Ratio in Resin | Iodine No. | Per Cent Cl | Gardner Color of Resin Linseed Oil Cook at 15 Gal. Length | Cook Time at 292° C., in hrs. | Cure Point of Varnish at 15 Gal. Length | Gardner Viscosity on 50% Resin in Linseed Oil Before Cook |
|---|---|---|---|---|---|---|---|---|---|---|
| −15 | 50 | 85 | 0.80 | 7.2 | 168 | 0.21 | 10 | 3.8 | Sec. 30 | Less than Z6. |
| +10 | 70 | 110 | 0.98 | 7.2 | 159 | 0.08 | 10 | 3.8 | 25 | Do. |
| +21 | 94 | Not det. | 20.37 | 7.2 | 154 | 0.11 | 9 | 1.9 | 25 | Greater than Z6. |
| +18 | 89 | 122 | 17.42 | 7.2 | 162 | 0.08 | 9 | 2.4 | 28 | Do. |

EXAMPLE NO. 2

A series of polymerizations were conducted at varying temperatures between −15° F. and +21° F. Propane was used as a refluxing diluent, the polymerization being carried to per cent yield of 50 to 94. Results are presented in Table No. 4.

TABLE 4

*Evaluation of isoprene-diisobutylene resin made under reflux—temperature of polymerization being sole variable—2% $AlCl_3$ used*

[50% Isoprene-50% Diisobutylene]

| Reaction Temp. | Yield | M. P. Resin (Ring and Ball) | Gardner Viscosity in Linseed Oil at 50% Conc. before Cook |
|---|---|---|---|
| 0° F | .85 | 84 | Less than Z6. |
| +15° F | .92 | 122 | Greater than Z6. |
| +20° F | .94 | Not det. | Do. |

The above examples shown only linseed oil in combination with the polymer. The invention is not however limited to linseed oil, since it is found to be applicable with any of the known varnish, enamel and paint base oils including such oils as tung oil, soya bean oil, oiticia oil, dehydrated castor oil, sardine oil, and the like, any of the drying, semi-drying, or baking oils, alone or in admixture, being suitable.

Thus the invention consists in the preparation of a copolymer from a critical proportion of mono-olefin and multi-olefin at a critical temperature range below a critical yield per cent, to produce a resin which, when dissolved in 50% concentration in a drying oil, yields a solution of low enough viscosity to be pumped, which can also be cooked into a high-grade varnish resin.

While there are above disclosed but a limited number of embodiments of the process of the invention, it is possible to produce still other embodiments without departing from the inventive concept herein disclosed and it is therefore desired that only such limitations be imposed on the appended claims as are stated therein or required by the prior art.

The invention claimed is:

1. In a process for preparing a polymer-linseed oil mixture which comprises the steps of copolymerizing diisobutylene with butadiene, using as diluent a proportion of hydrocarbon refrigerant in a limited quantity as to produce a composite boiling point of the resulting olefin-diluent mixture at the desired polymerization temperature, polymerizing the resulting mixture by the application thereto of a dissolved Friedel-Crafts active metal halide polymerization catalyst and thereafter dissolving the resulting polymer solution in linseed oil, the improvement steps in combination which comprise employing about 45 to 55 parts by weight of diisobutylene with sufficient parts by weight of butadiene to make 100 parts by weight of olefin, cooling the total olefin-diluent mixture to a temperature within the range between +10° F. and −15° F., maintaining the temperature of the mixture within said range during the polymerization, limiting the yield of polymer to from 60% to 89% of the total olefins employed, thereby producing a fluid, easily flowable solution of polymer in a mixture of residual unreacted olefins and diluent, transferring the resulting fluid, easily flowable solution into an equal weight linseed oil, whereby the solid polymer is dissolved in the linseed oil and the residual unreacted olefins and hydrocarbon diluent are separated to obtain a final solution of polymer in linseed oil which is characterized by a viscosity value less than Gardner Z6.

2. In a process for preparing a film coating composition which comprises the steps of copolymerizing diisobutylene with butadiene, using as a hydrocarbon diluent comprising a proportion of hydrocarbon refrigerant in a limited quantity as to produce a composite boiling point of the resulting olefin-diluent mixture at the desired polymerization temperature, and polymerizing the resulting material by the application thereto of a dissolved Friedel-Crafts active metal halide polymerization catalyst, thereafter dissolving the resulting polymer solution in linseed oil and cooking the resulting polymer-linseed oil mixture to produce a high grade paint and varnish base, the improvement steps in combination which comprise employing about 45 to 55 parts by weight of diisobutylene with sufficient parts by weight of butadiene to make 100 parts by weight of olefin, cooling the total olefin-diluent mixture to a temperature within the range between +10° F. and −15° F., maintaining the temperature of the mixture within said range during the polymerization, limiting the yield of polymer to from 60% to 89% of the total olefins employed, thereby producing a fluid, easily flowable solution of polymer in a mixture of residual unreacted olefins and diluent, transferring the resulting fluid, easily flowable solution into an equal weight of linseed oil, whereby the solid polymer is dissolved in the linseed oil and the residual unreacted olefins and hydrocarbon diluent are separated to obtain a final solution of polymer in linseed oil which is characterized by a viscosity value less than Gardner Z6.

OBER C. SLOTTERBECK.
DAVID W. YOUNG.

REFERENCES CITED

The following references are of record in the file of this patent:

UNITED STATES PATENTS

| Number | Name | Date |
|---|---|---|
| 2,039,364 | Thomas et al. | May 5, 1936 |
| 2,151,382 | Harmon | Mar. 21, 1939 |
| 2,476,000 | Sparks et al. | July 12, 1949 |